Patented Dec. 26, 1939

2,185,143

UNITED STATES PATENT OFFICE 2,185,143

VAT PRINTING BLACK

Moses L. Crossley and Lawrence D. Lytle, Plainfield, N. J., assignors, by mesne assignments, to American Cyanamid Company, New York, N. Y., a corporation of Maine No Drawing. Application January 23, 1937, Serial No. 121,984

6 Claims. (Cl. 8—18)

This invention relates to black vat dyes of the dibenzanthrone series and more particularly it relates to black dyes of great fastness to fabric stiffening treatments.

In the past, the vat black of the dibenzanthrone series was obtained by nitrating dibenzanthrone, reducing to the green amino compound, dyeing and then oxidizing with hypochlorite to produce the black. Printing blacks were obtained by oxidizing the amino compound. Somewhat better shades are obtainable from amino-chlordibenzanthrone treated in the same manner. While the dibenzanthrone vat blacks hitherto produced show excellent fastness to light and washing, they possess certain disadvantages. The first and most important is that they are not fast to certain fabric stiffening processes such as the so-called "Trubenizing" process in which the portion of the fabric to be stiffened, usually collars of men's shirts, cuffs, and the like, is impregnated with a solution of a suitable plastic, normally an acetone solution of cellulose acetate. When this process is employed with material dyed or printed with the ordinary vat blacks of commerce, the black is attacked by the impregnating chemicals, changes in shade, and tends to produce a reddish color. As a result, it has been considered impossible to use the ordinary printing vat blacks in materials which are to be subjected to "Trubenizing" or similar stiffening or crease proofing processes and it has been necessary to use other black dyes which are more expensive and do not have other advantages of the dibenzanthrone compounds such as extreme light fastness and the like. A second disadvantage of the dibenzanthrone blacks produced hitherto, while not as serious, lies in the reddish tinge which the black possesses. It is desirable to have a more greenish tinge in the black for best results. The ordinary dibenzanthrone blacks also "water spot" and this is a limitation to their use.

According to the present invention, we have found that a dibenzanthrone black fast to "Trubenizing" and similar processes, having a desirable greenish black shade and which does not water spot, can be produced by fusing dibenzanthrone compounds containing radicals which promote coupling or condensing of dye molecules with caustic alkali such as caustic potash, caustic soda or mixtures. The exact chemical constitution of the products has not been determined. Because of the fact that products from halogenated dibenzanthrone and halogen amino or nitro-dibenzanthrone all give blacks having the same property of being fast to "Trubenizing" and similar processes, we believe that the caustic fusion results in a condensation of a number of molecules of the dibenzanthrone compound because the same properties are obtained with any of the substituents which tend to split out and cause coupling and because in the case of both halogen and nitro or amino compounds, ammonia or hydrogen halide is split out. With the halogenated compounds, it seems probable that the condensation or polymerization produces chains of dye molecules or possibly condensed nuclei. In the case of the nitrogen containing groups, there are various possibilities, but it seems probable that condensation takes place by formation of heterocyclic rings of the carbazol type. The presence of the groups which can split out or form bridges appears to be essential to the invention because if dibenzanthrone compounds free from such groups are fused, no blacks are obtained which have the properties of the present invention. The above explanation is advanced as the most probable in view of the known facts. It should be clearly understood, however, that our invention is in no sense limited to this explanation because the exact chemical constitution of the products has not been determined and it is possible that other factors may be present.

While all of the dibenzanthrone compounds having substituent groups which favor condensation or polymerization yield blacks which are fast to "Trubenizing", it should be understood that the shades of these blacks are not identical but will vary with the raw material entering into the fusion. They all are, however, characterized by a better, more greenish shade, although some are better than others.

We have found that it is desirable to effect the caustic fusion in the presence of reducing agents such as methyl alcohol, ethyl alcohol, dextrin and the like. The presence of these reducing agents is not essential, as the dibenzanthrone compounds, when fused with caustic alkali in the absence of reducing agents, give substantially the same blacks. In the case of halogen compounds, if the theoretical explanation advanced above is true, as we believe it probably is, a reducing agent would not theoretically be required to effect condensation, as hydrogen halide could be split out. The same is true in the case of amino and halogen amino compounds. In the case of the nitro compounds, theoretically a reducing agent would be necessary and we believe, although it has not been definitely proven as yet, that when a nitro-dibenzanthrone compound is fused without a reducing agent, a certain proportion is decomposed and acts as a reducing agent for the remainder.

The presence of such materials as methyl or ethyl alcohol or dextrin in the fusion tends to make the fusion proceed more evenly, and appears to enhance the yield. It is quite possible that the alcohols or dextrins have effects other than reducing, and these may be either chemical or physical. The invention is, of course, not limited to any theory of action of the reducing agents in the fusion, but in its more specific aspects includes processes in which the reducing agents are present.

The blacks which are produced by the present invention can be used for dyeing and printing in the usual manner, and broadly, the present invention is not concerned with the particular way in which the dyestuff is used, but rather is directed to the new dyestuff itself. It is an advantage of the present invention that the dyestuff is useable in the ordinary types of printing pastes, dye baths, and the like, without requiring special conditions.

While the invention is not limited to any particular method of using the final dyestuff, it has been found that the products of the present invention can be colloidized as described in the patent of Crossley and Kienle, No. 2,090,511, issued August 17, 1937, with great ease, and the resulting powders show extraordinarily high autodispersibility.

The temperature of the fusion, amounts of caustic potash, and the degree of replacement by caustic soda may be varied within wide limits. The examples which will follow, and which give typical preferred working conditions, are not intended to limit the invention to the particular temperatures and proportions set forth as these are not critical. This is a further advantage of present invention as it makes it unnecessary to control temperatures and other reaction conditions with extreme care, and hence permits operating with a minimum of special supervision.

In the following examples, the parts are by weight unless otherwise stated.

*Example 1*

100 parts of dinitrodibenzanthrone produced by nitrating in nitrobenzene is mixed with 100 parts of methyl alcohol to form a uniform paste. 500 parts of caustic potash is melted and heated to 180° C. and the dibenzanthrone alcohol paste is then fed in to the molten potash at such a rate than the charge does not foam over and the temperature is maintained. After all of the dibenzanthrone has been introduced, the fusion mass is heated up to 200° C. and stirred at this temperature for two hours. The melt is then permitted to cool to 150° C. and 800 parts of water are slowly added. The diluted melt is then drowned in 3000 parts of water and heated to 80° C. Air is then bubbled through the solution of the leuco dyestuff with vigorous stirring until the dye is completely precipitated.

The precipitate is filtered and washed free from alkali. It may then be formed into a paste, colloidized or prepared in any of the usual forms for printing and dyeing. Dyes and prints made with the product are completely fast to "Trubenizing" and similar creaseproofing processes, and are a bright black of a desirable greenish tone.

Instead of using nitrodibenzanthrone obtained by nitrating in nitrobenzene, the product obtained by nitrating in glacial acetic acid or without a solvent may also be employed and produces fast blacks having desirable greenish shades. Instead of precipitating the leuco dyestuff by air, other oxidizing agents may be used or it may be precipitated with an acid. Instead of using caustic potash, a mixture of caustic soda and caustic potash may be employed and produces the same results.

*Example 2*

Aminochlordibenzanthrone, which is produced by chlorinating in 93% sulfuric acid to produce a mono or dichlor derivative, then nitrated with sodium nitrate and reduced with sodium sulfide, is fused under the same conditions as in Example 1. The dyestuff obtained by precipitating and filtering is a black which is fast to "Trubenizing" and which has a greenish tone, although somewhat different from that of the product of Example 1.

*Example 3*

Mono, di or trichlordibenzanthrone are produced by various processes, for example, chlorine gas in nitrobenzene, trichlorbenzene, dichlorbenzene or other solvents, chlorine gas in sulfuric acid, sulfuryl chloride in nitrobenzene or hypochlorite in sulfuric acid. The chlordibenzanthrone is then fused with caustic alkali described in Example 1. Blacks are obtained which are fast to "Trubenizing" and which have excellent shades, differing slightly from that of Example 1, and differing among themselves depending on the extent of chlorination and on the process by which the chlorination took place.

Bromdibenzanthrone, when treated in the same manner as the chlorine compounds, give similar blacks.

*Example 4*

100 parts of nitrodibenzanthrone as described in Example 1 are mixed with 100 parts of dextrin which is then fed into a caustic potash melt and the dye recovered under the conditions described in Example 1. The color of the dye is practically the same as in Example 1 and it is entirely fast to "Trubenizing".

*Example 5*

Nitrodibenzanthrone as described in Example 1 is fused with caustic potash without any reducing agent, the other conditions being the same as in Example 1. The color obtained is practically identical with that of Example 1 and shows the same fastness to "Trubenizing".

We claim:

1. A material dyed with a black vat dyestuff of the dibenzanthrone series which is obtained by fusing with caustic alkali a dibenzanthrone compound having a group capable of promoting condensation of dye molecules, said dye being fast to acetone solutions of cellulose acetate, said material after dyeing being impregnated with a solution of an organic plastic to render it stiff and creaseproof.

2. A material dyed with a black vat dyestuff of the dibenzanthrone series which is obtained by fusing with caustic alkali a dibenzanthrone compound having a group capable of promoting condensation of dye molecules, said dye being fast to acetone solutions of cellulose acetate, said material after dyeing being impregnated with a solution of cellulose acetate to render it stiff and creaseproof.

3. A dyed material according to claim 1 in which the vat black dyestuff is obtained by fusing with caustic alkali a nitrodibenzanthrone compound.

4. A dyed material according to claim 2 in which the vat black dyestuff is obtained by fusing with caustic alkali a nitrodibenzanthrone compound.

5. A dyed material according to claim 1 in which the vat black dyestuff is obtained by fusing a chlorine dibenzanthrone compound with caustic soda.

6. A dyed material according to claim 2 in which the vat black dyestuff is obtained by fusing a chlorine dibenzanthrone compound with caustic soda.

MOSES L. CROSSLEY.
LAWRENCE D. LYTLE.